US009830289B2

United States Patent
Pulyala et al.

(10) Patent No.: US 9,830,289 B2
(45) Date of Patent: Nov. 28, 2017

(54) METHODS AND APPARATUS FOR AGGREGATING PACKET TRANSFER OVER A VIRTUAL BUS INTERFACE

(71) Applicant: Apple Inc., Cupertino, CA (US)

(72) Inventors: Radha Kumar Pulyala, Santa Clara, CA (US); Saurabh Garg, San Jose, CA (US); Karan Sanghi, San Jose, CA (US)

(73) Assignee: APPLE INC., Cupertino, CA (US)

( * ) Notice: Subject to any disclaimer, the term of this patent is extended or adjusted under 35 U.S.C. 154(b) by 172 days.

(21) Appl. No.: 14/856,283

(22) Filed: Sep. 16, 2015

(65) Prior Publication Data

US 2016/0077989 A1    Mar. 17, 2016

Related U.S. Application Data (60) Provisional application No. 62/050,973, filed on Sep. 16, 2014.

(51) Int. Cl.
   *G06F 13/28*   (2006.01)
   *G06F 13/40*   (2006.01)
   *G06F 13/42*   (2006.01)

(52) U.S. Cl.
   CPC ........ *G06F 13/287* (2013.01); *G06F 13/4022* (2013.01); *G06F 13/4282* (2013.01)

(58) Field of Classification Search
   CPC . G06F 13/287; G06F 13/4022; G06F 13/4282
   See application file for complete search history.

(56) References Cited

U.S. PATENT DOCUMENTS

| | | |
|---|---|---|
| 5,943,507 A | 8/1999 | Cornish et al. |
| 6,553,446 B1 | 4/2003 | Miller |
| 6,948,004 B2 | 9/2005 | Gasbarro et al. |
| 7,100,020 B1 | 8/2006 | Brightman et al. |
| 7,941,682 B2 | 5/2011 | Adams |
| 8,255,725 B2 | 8/2012 | Shimazaki et al. |

(Continued)

FOREIGN PATENT DOCUMENTS

| | | | | |
|---|---|---|---|---|
| FR | EP 3013008 A1 | * | 4/2016 | ........... H04L 45/245 |
| JP | 2013246642 A | | 12/2013 | |

OTHER PUBLICATIONS

ECN L1 PM Substates with CLKREQ approved Aug. 23, 2012.

(Continued)

*Primary Examiner* — Ernest Unelus
*Assistant Examiner* — Ronald Modo
(74) *Attorney, Agent, or Firm* — Gazdzinski & Associates, P.C.

(57) ABSTRACT

Methods and apparatus for data aggregation and multiplexing of one or more virtual bus interfaces via a physical bus interface. Various disclosed embodiments are configured to: (i) multiplex multiple logical interfaces over a single physical interface, (ii) exchange session management and logical interface control, (iii) manage flow control, (iv) provide "hints" about the data (e.g., metadata), and/or (v) pad data packets. In one particular implementation, the methods and apparatus are configured for use within a wireless-enabled portable electronic device, such as for example a cellular-enabled smartphone, and make use of one or more features of a high-speed serialized physical bus interface.

10 Claims, 7 Drawing Sheets

(56) References Cited

U.S. PATENT DOCUMENTS

| | | |
|---|---|---|
| 8,352,624 B2 | 1/2013 | Zimmerman et al. |
| 8,656,228 B2 | 2/2014 | Check et al. |
| 8,788,822 B1 * | 7/2014 | Riddle ................ H04L 47/6275 |
| | | 713/169 |
| 2002/0169938 A1 | 11/2002 | Scott et al. |
| 2005/0285862 A1 | 12/2005 | Noda et al. |
| 2007/0070997 A1 | 3/2007 | Weitz et al. |
| 2010/0017655 A1 | 1/2010 | Gooding et al. |
| 2010/0098419 A1 | 4/2010 | Levy et al. |
| 2011/0219208 A1 | 9/2011 | Asaad et al. |
| 2011/0320861 A1 | 12/2011 | Bayer et al. |
| 2015/0378737 A1 * | 12/2015 | Debbage ............. G06F 12/0875 |
| | | 712/225 |
| 2016/0364350 A1 | 12/2016 | Sanghi et al. |

OTHER PUBLICATIONS

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

METHODS AND APPARATUS FOR AGGREGATING PACKET TRANSFER OVER A VIRTUAL BUS INTERFACE

PRIORITY AND RELATED APPLICATIONS

This application claims the benefit of priority to co-owned and U.S. Provisional Patent Application Ser. No. 62/050,973 of the same title filed Sep. 16, 2014, which is incorporated herein by reference in its entirety.

This application is also related to commonly owned and U.S. Provisional Patent Application Ser. No. 62/112,061 entitled "METHODS AND APPARATUS FOR CONTROLLED RECOVERY OF ERROR INFORMATION BETWEEN INDEPENDENTLY OPERABLE PROCESSORS" filed Feb. 4, 2015; U.S. Provisional Patent Application Ser. No. 62/061,605 entitled "METHODS AND APPARATUS FOR AN INTER-PROCESSOR COMMUNICATION LINK BETWEEN INDEPENDENTLY OPERABLE PROCESSORS" filed Oct. 8, 2014; and U.S. Provisional Patent Application Ser. No. 62/175,174 entitled "METHODS AND APPARATUS FOR SYNCHRONIZING UPLINK AND DOWNLINK TRANSACTIONS ON AN INTER-PROCESSOR COMMUNICATION LINK" filed Jun. 12, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronics devices, as well as networks thereof. More particularly, in one exemplary aspect, the disclosure is directed to methods and apparatus for aggregating packet transfer over a virtual bus-based interface.

DESCRIPTION OF RELATED TECHNOLOGY

Various types of data multiplexing approaches are currently known, One such exemplary data multiplexing solution implements Ethernet capabilities on a Universal Serial Bus (USB). In particular, the USB Implementers Forum (USB-IF) standards provide for a Communication Device Class (CDC) which supports three (3) subclasses: Ethernet Control Model (ECM), Ethernet Emulation Model (EEM), and Network Control Model (NCM). Those of ordinary skill in the related arts will recognize that the USB CDC NCM subclass was generally promulgated to address operation within e.g., handheld mobile devices such as cellular-enabled smartphones, etc. In large part, the USB CDC NCM subclass was tailored to improve power consumption, and maximize direct memory access (DMA) technologies which are common within such consumer electronics devices.

As described within "*USB Communication Class Subclass Specification for Network Control Model (NCM) Devices; Revision* 1.0 (*Errata* 1)" incorporated by reference in its entirety herein, USB CDC NCM is a protocol by which USB hosts and device can effectively exchange Ethernet frames. As used therein, the term "Ethernet frames" refer without limitation to IPv6 and IPv4 (Internet Protocol) datagrams that are configured for transport over a communication network. USB CDC NCM supports aggregation of multiple Ethernet frames within a single USB transfer, and also limited configuration of (e.g., placement, etc.) Ethernet frames within a USB transfer.

Unfortunately, existing bus protocols for USB CDC NCM do not support capabilities for multiplexing of interfaces, flow control, interface and session management, transfer hits and packet padding. Specifically, USB CDC NCM does not include: (i) mechanisms for multiplexing multiple logical interfaces over a single physical interface, (ii) mechanisms for exchanging session management and logical interface control, (iii) mechanisms for flow control, (iv) mechanisms for providing "transfer hints" about the data (e.g., metadata), and/or (v) mechanisms for padding data packets.

SUMMARY

The present disclosure satisfies the foregoing needs by providing, inter alia, methods and apparatus for aggregating packet transfer over a virtual bus based interface.

In a first aspect, a processor apparatus is disclosed. In one embodiment, the processor apparatus includes: a first digital processor; a physical bus interface in data communication with the first digital processor; and a computer readable medium comprising one or more computer readable instructions. In one exemplary implementation the one or more computer readable instructions are configured to, when executed by the first digital processor, cause the first processor to: receive a plurality of datagrams from a plurality of data interfaces; for each one of the plurality of data interfaces: order a corresponding subset of the plurality of datagrams into a corresponding session; generate one or more commands based on one or more session operations associated with the corresponding session; aggregate the plurality of datagrams into an aggregated data block; aggregate the one or more commands into an aggregated command block; and transmit the aggregated data block and the aggregated command block via the physical bus interface.

In one variant, the one or more commands comprise one or more flow control commands for the corresponding session. In some cases, the corresponding session is associated with one data interface.

In another variant, the processor apparatus is embodied as one or more integrated circuits (ICs), such as part of a system-on-chip (SoC) device, and/or part of a chipset.

In a second aspect, a method of multiplexing a plurality of data structures is disclosed. In one embodiment, the multiplexing includes multiplexing into one or more aggregated data structures for transit via a virtualized bus interface, and the method includes: aggregating a plurality of datagrams into an aggregated data block, the aggregating the plurality of datagrams into an aggregated data block being characterized by one or more commands; aggregating the one or more commands into an aggregated command block; and transmitting the aggregated data block and the aggregated command block.

In one variant, the transmission of the aggregated data block is performed via the physical bus interface. In some cases, the transmission of the aggregated command block is performed via the physical bus interface. Alternatively, the transmission of the aggregated command block can be performed via an out-of-band interface.

In a second variant, the one or more commands indicate the addition or removal of a session comprised of a subset of the plurality of datagrams.

In a third variant, the one or more commands indicate the increase or decrease of a data rate associated with a session comprised of a subset of the plurality of datagrams.

In a fourth variant, the one or more commands indicate the presence of one or more padding data within a session comprised of a subset of the plurality of datagrams.

In a third aspect, a processor apparatus is disclosed. In one embodiment, the processor apparatus includes: a first digital processor; a physical bus interface in data communication with the first digital processor; and a computer readable medium comprising one or more computer readable instructions. In one exemplary implementation, the one or more computer readable instructions are configured to, when executed by the first digital processor, cause the first processor to: receive an aggregated data block and an associated aggregated command block; divide the aggregated command block into one or more constituent commands; divide the aggregated data block into a plurality of datagrams based on the one or more constituent commands; and provide the plurality of datagrams to corresponding ones of a plurality of data interfaces.

In one variant, the processor apparatus is embodied as one or more integrated circuits (ICs), such as part of a system-on-chip (SoC) device, and/or part of a chipset.

In another variant, the aggregated data block comprises one or more Internet Protocol (IP) datagrams. In one such case, the first processor is further configured to order at least a subset of the plurality of datagrams into a session associated with one data interface.

In a fourth aspect, a method of demultiplexing one or more aggregated data into a plurality of data structures is disclosed. In one embodiment, the method includes: receiving an aggregated data block and an associated aggregated command block; dividing the aggregated command block into one or more constituent commands; dividing the aggregated data block into a plurality of datagrams based on the one or more constituent commands; and generating at least one session from the plurality of datagrams.

In one variant, the method further includes identifying when at least one command block is missing or corrupted and responsively requesting a retransmission of the at least one command block.

In a second variant, the method further includes identifying when at least one command block is missing or corrupted and responsively flagging an error.

In a third variant, the method further includes separately queuing one or more aggregated data blocks and one or more aggregated command blocks; and identifying the aggregated data block and the associated aggregated command block based on at least one sequence number associated therewith.

In a fourth variant, the method further includes storing the at least one session within a receive buffer. In one such case, the method further indicates when the receive buffer is in danger of overflowing or under-flowing.

In a fifth variant, the generated at least one session is based at least in part on stateful information associated with a previous aggregated command block.

Other features and advantages of the present disclosure will immediately be recognized by persons of ordinary skill in the art with reference to the attached drawings and detailed description of exemplary embodiments as given below.

All Figures © Copyright 2014-2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of modifications to a Peripheral Component Interconnect Express (PCIe) to support a virtual bus based packet interface, it will be recognized by those of ordinary skill that the present disclosure is not so limited. In fact, the various aspects of the disclosure are useful in any device or network of devices that is configured to incorporate and coordinate multiple independent processing elements as is disclosed herein.

Additionally, while the following embodiments describe specific implementations of e.g., dedicated address spaces, legacy support capabilities, and specific protocols, those of ordinary skill in the related arts will readily appreciate that such descriptions are purely illustrative, and that the present disclosure is not so limited, as is specifically contemplated for use with a variety of other implementations.

As used herein, the term "logical" or "virtual" are interchangeably used to refer, without limitation, to an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers to, without limitation, data transactions which are transacted within a logical or physical interface, and which affect the mechanisms, attributes or functionalities of the logical or physical interface. In contrast, the term "out-of-band" refers to data transactions which are not transacted within a logical or physical interface, and which affect the mechanisms, attributes or functionalities of the logical or physical interface.

Exemplary Data Multiplexing

Methods and apparatus are now described for supporting data aggregation and multiplexing of one or more virtual bus interfaces via a physical bus interface. In one such exemplary embodiment, the virtual bus multiplexing supports flow control for each of the virtualized bus interfaces. Flow control refers generally and without limitation to a process of managing a rate of data transmission of the one or more virtual bus interfaces to prevent data loss/corruption (e.g., overwhelming the receiver), or to achieve other desired performance.

Figure 1:
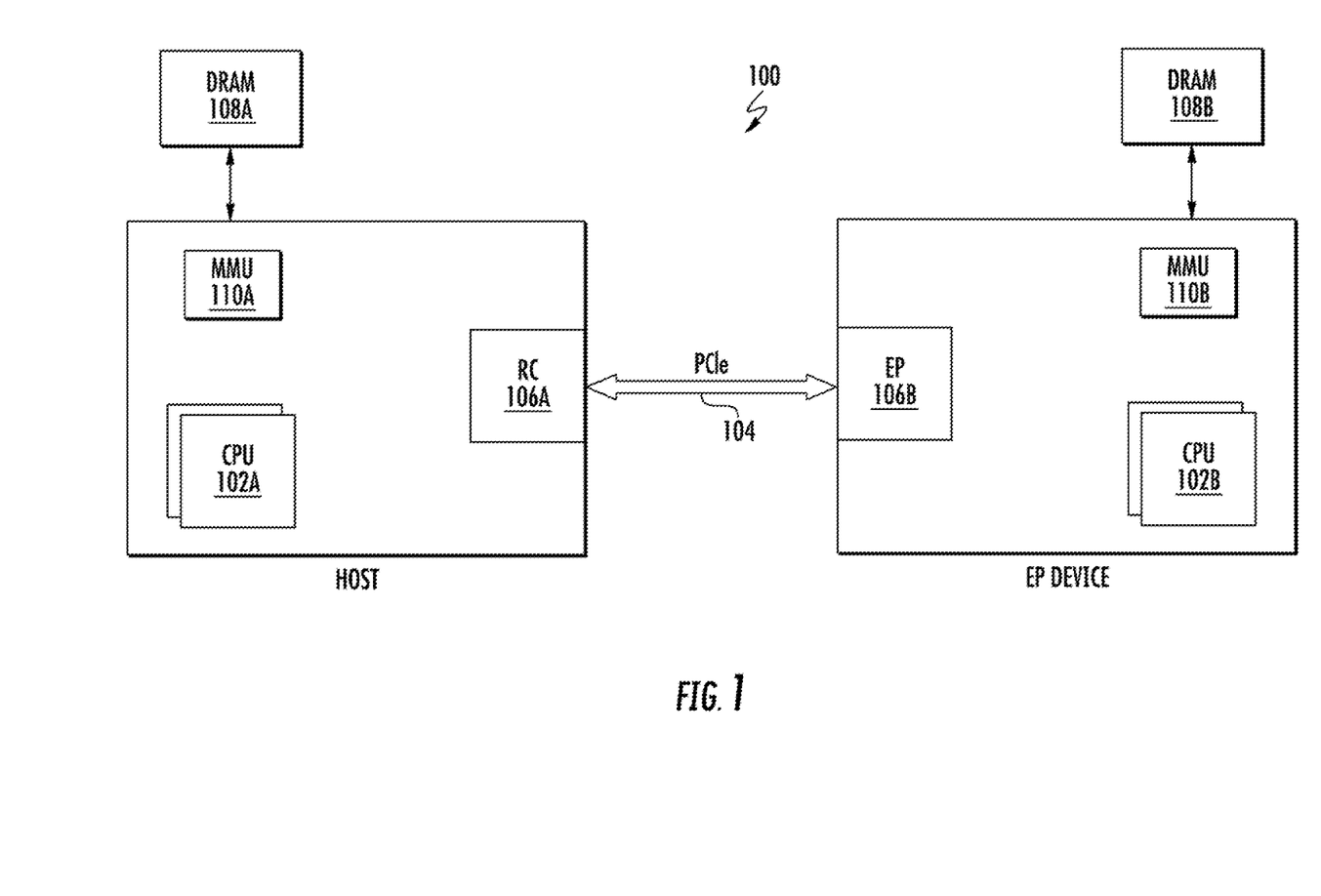
FIG. 1 is a logical block diagram of one exemplary embodiment of an apparatus useful for illustrating various principles described herein.

FIG. 1 illustrates exemplary apparatus 100 useful for illustrating various principles described herein. As shown, the apparatus 100 includes a first and second processor (102A, 102B), and a physical bus interface 104 that is configured to transact multiple virtualized bus interfaces.

Historically, most computing devices have been designed according to the Personal Computer (PC) paradigm, where a single processor is largely responsible for managing software execution. However, computing devices have significantly evolved to fit a diverse ecosystem of designs and uses; additionally, processor technologies have improved, offering significant computing power at near commodity prices. Within the context of consumer electronics (e.g., personal wireless devices (such as the iPhone), personal media devices (such as the iPad/iPod), and personal computers (such as the MacBook Pro and MacBook Air)), various considerations have resulted in designs which utilize multiple independent processor operation.

For example, in typical wireless devices, an applications processor (AP) operates independently from a wireless baseband modem processor (BB). During normal operation, the wireless device may selectively use one or both of the AP and BB, depending on the particular application. When either the AP or BB is not in active use (or in preparation for use, etc.), the processor is put to sleep so as to reduce power consumption, etc. Conceptually similar design paradigms are used for media devices (where the media processor is independent from an applications processor), etc.

As shown, the physical bus interface 104 includes an inter-processor communication (IPC) that is loosely based on the Peripheral Component Interconnect Express (PCIe) standard (e.g., as is described in "PCI Express Base Specification Revision 3.1" published Oct. 8, 2014. Those of ordinary skill in the related arts, given the contents of the present disclosure, will readily appreciate that other bus interface standards may be substituted with equal success. Various modifications to the underlying physical bus interface 104 (and protocols used therewith) to support IPC functionality is described in greater detail hereinafter.

In one exemplary embodiment, the first processor 102A includes an applications processor (AP). As shown in FIG. 1, the first processor 102A is coupled to a Root Complex (RC) 106A which functions as the "host" of the IPC bus. The second processor 102B includes a wireless modem baseband (BB). As shown in FIG. 1, the second processor 102B is coupled to an Endpoint (EP) 106B which functions as the "peripheral" of the IPC bus.

In the exemplary embodiment, the physical bus interface 104 is a point-to-point communication channel between two PCIe ports (the RC and EP) allowing both to send/receive access requests (configuration read/write, I/O read/write, memory read/write) and interrupts. At the physical level, a link is composed of one or more lanes, each lane having receive and transmit component (pcie_rx, pcie_tx). Each lane is a full-duplex byte stream, transporting data packets in eight-bit "byte" formats, between the RC and EP of a link, in both directions simultaneously. The physical link 104 can support multiple logical links (or virtual bus interfaces) representing multiple ongoing data sessions.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory 110 (e.g., a Flash memory) which is configured to store computer readable instructions, and retain the stored computer readable instructions without power.

In one embodiment, the computer readable instructions, when executed by at least one of the first or second processors (102A, 102B) is configured to multiplex multiple virtual bus interfaces over a single physical interface 104.

In one embodiment, the computer readable instructions, when executed by at least one of the first or second processors (102A, 102B) is configured to exchange session management information and virtual bus interface control information.

In one embodiment, the computer readable instructions, when executed by at least one of the first or second processors (102A, 102B) is configured to perform flow control by enabling, disabling, and/or throttling data transfer rates of the single physical interface 104. In one such variant, flow control is implemented based at least in part on a receiver of the data flow identifying a current and/or future overflow condition.

In one embodiment, the computer readable instructions, when executed by at least one of the first or second processors (102A, 102B) is configured to provide metadata regarding a data transaction. In one such variant, the metadata includes so-called "hint data" which indicates that the data conforms to a particular format e.g., IPv4, IPv6, etc.

In one embodiment, the computer readable instructions, when executed by at least one of the first or second processors (102A, 102B) is configured to insert padding data to conform to various transaction requirements (e.g., to ensure that a minimum amount of data is transferred). In some variants, the padding may be fixed (all zeros, or all ones), random, or proprietary in nature.

Figure 2:
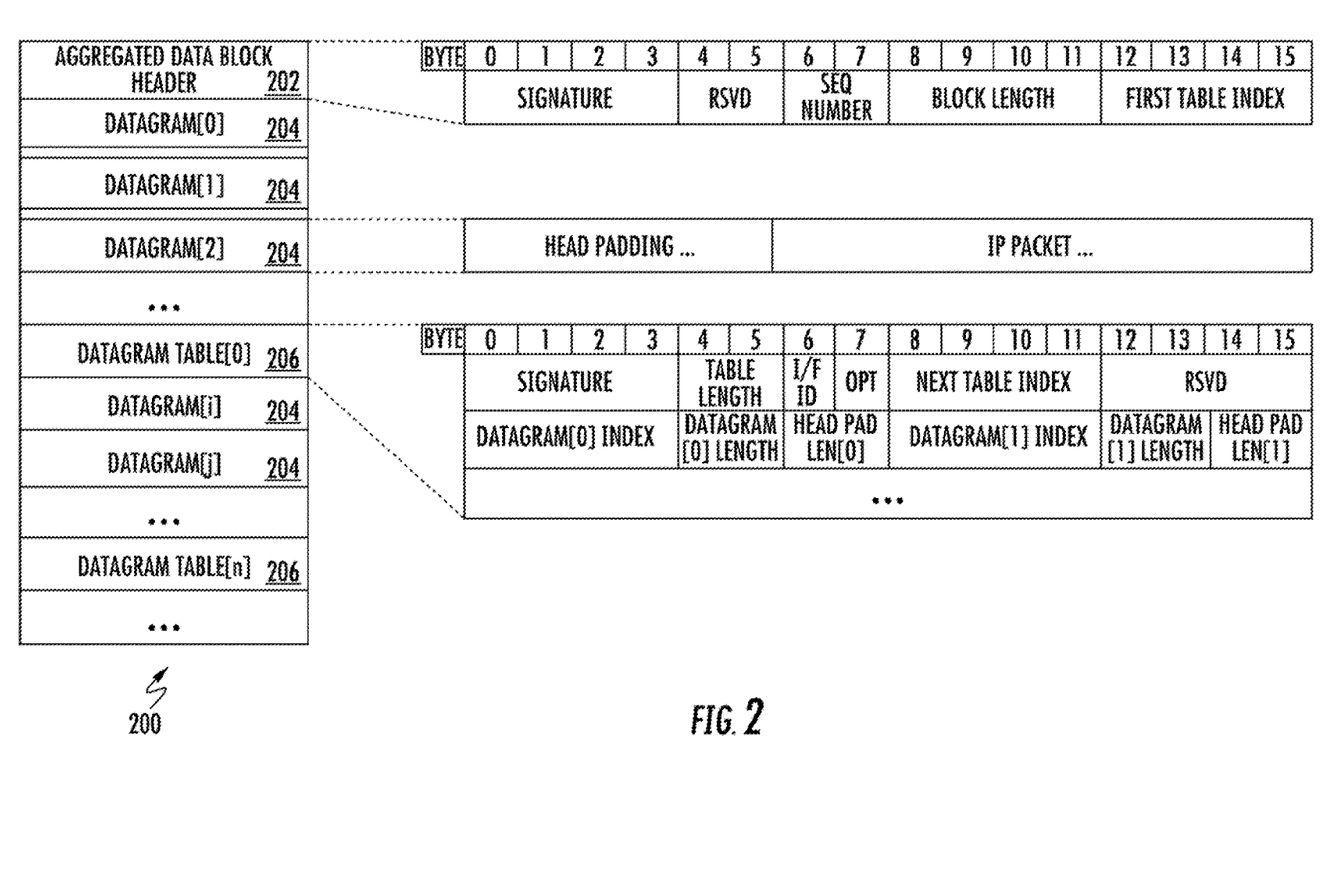
FIG. 2 is a logical block diagram of one exemplary embodiment of an aggregated data block useful for transacting applications data.

FIG. 2 illustrates one exemplary aggregated data block 200 useful for transacting applications data (e.g., in the form of datagrams). As shown, the exemplary aggregated data block 200 includes an aggregated data block header 202, a plurality of datagrams 204, and one or more datagram tables 206. The exemplary format is purely illustrative, other implementations may add, modify, re-size, re-purpose, and/or remove fields (subject to the requirements of their underlying technology), without departing from the various principles described herein.

As shown, the aggregated data block header 202 includes a signature field, sequence number, block length, and first table index. The signature field is configured to indicate the presence of the aggregated data block header 202 (to differentiate the data block header from a datagram table or command block header). The sequence number is an automatically incrementing value which indicates continuity (i.e., that no aggregated data blocks have been skipped or lost). The block length provides the total length of the aggregated data block including the aggregated data block header 202, all the datagrams 204, and all the datagram tables 206. The first table index indicates the location of the next datagram table (which is not necessarily sequential).

As shown each datagram 204 includes padding information and a payload. In the exemplary case, the payload is an IP packet, however those of ordinary skill, given the contents of the present disclosure, will readily appreciate that other datagram formats may be substituted (e.g., proprietary and/or other application specific datagram formats).

As shown the datagram tables 206 include a signature, table length, interface identifier, next table index, and a plurality of datagram information (index, length, padding, etc.). Similar to the block header, the signature indicates the presence of a datagram table, the table length indicates the length of the table, and the next table index provides a reference to the location of the next datagram table. The interface identifier is configured to identify the virtual bus interface that the datagram table is associated with (i.e., each virtual bus interface has its own distinct set of datagrams and datagram tables), and the plurality of datagram information allows the virtual bus interface to unpack the datagrams associated therewith.

Figure 3:
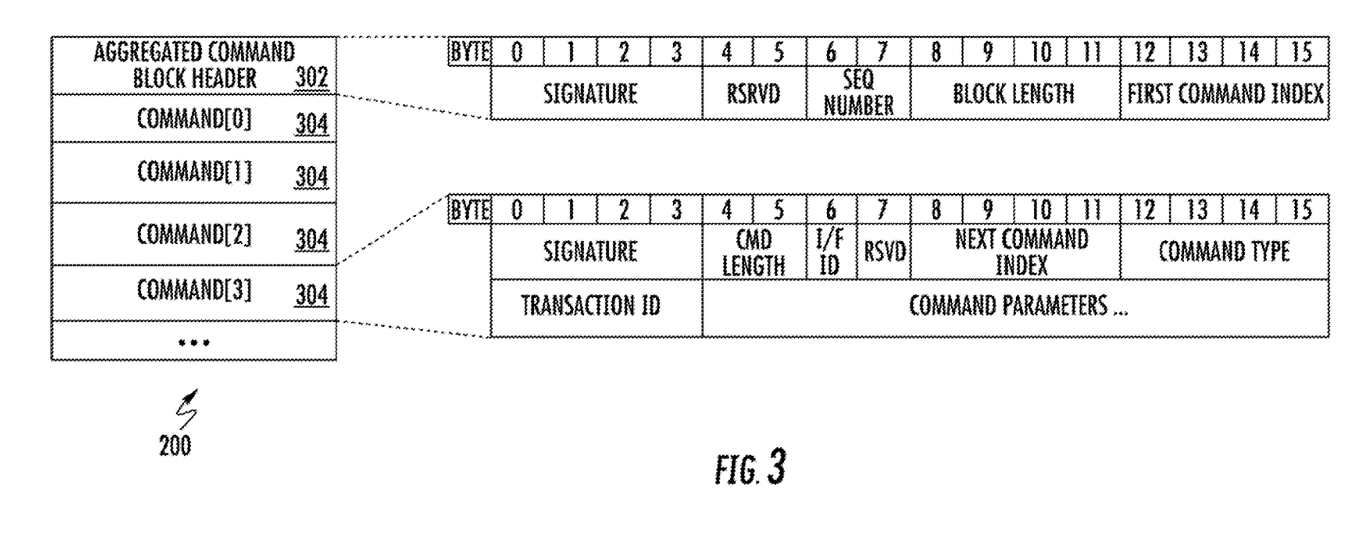
FIG. 3 is a logical block diagram of one exemplary embodiment of an aggregated command block useful for controlling session and virtual bus interface operation.

FIG. 3 illustrates one exemplary aggregated command block 300 useful for controlling session and virtual bus interface operation. As shown, the exemplary aggregated command block 300 includes an aggregated command block header 302, and one or more commands 304.

As shown, the aggregated command block header 302 includes a signature field, sequence number, block length, and first command index. The signature field is configured to indicate the presence of the aggregated command block header 302. The sequence number is an automatically incrementing value that can be used to recover the original ordered continuity in the event that one or more blocks is lost or received in non-consecutive order. The block length provides the total length of the aggregated command block including the aggregated command block header 302, and all the commands 304. The first command index indicates the location of the next command (which is not necessarily sequential).

As shown each command 304 includes a signature, command length, interface identifier, next command index, and a plurality of command information (command type, transaction identifier, and command parameters, etc.). The signature indicates the presence of a command, and the next command index provides a reference to the location of the next command. The interface identifier is configured to identify the virtual bus interface that the command is associated with, and the plurality of command information is used to manage the virtual bus interface (e.g., enable, disable, throttle, etc.).

Figure 4:
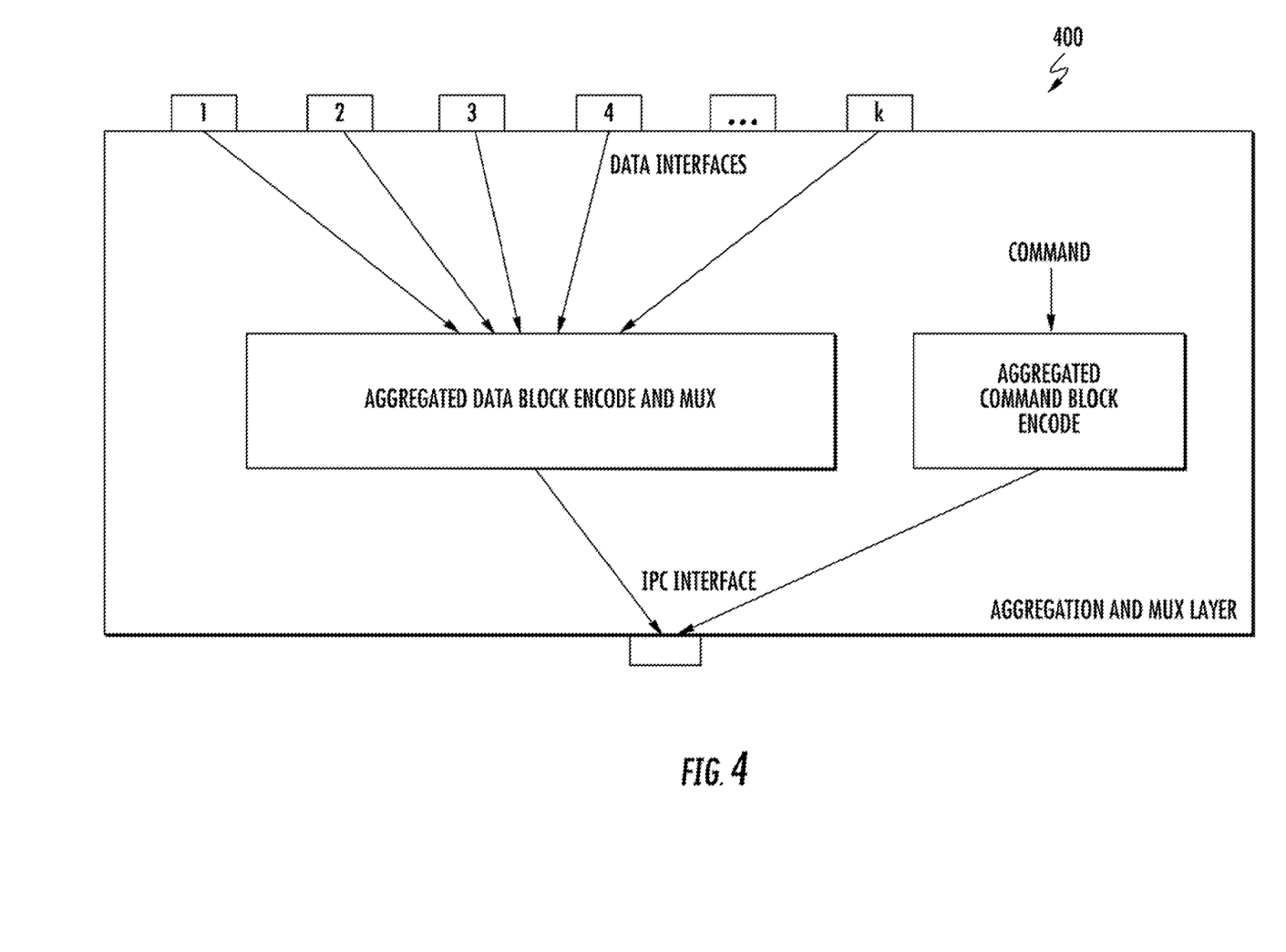
FIG. 4 is a logical block diagram illustrating one embodiment for transmit path multiplexing in accordance with the described embodiments.
Figure 5:
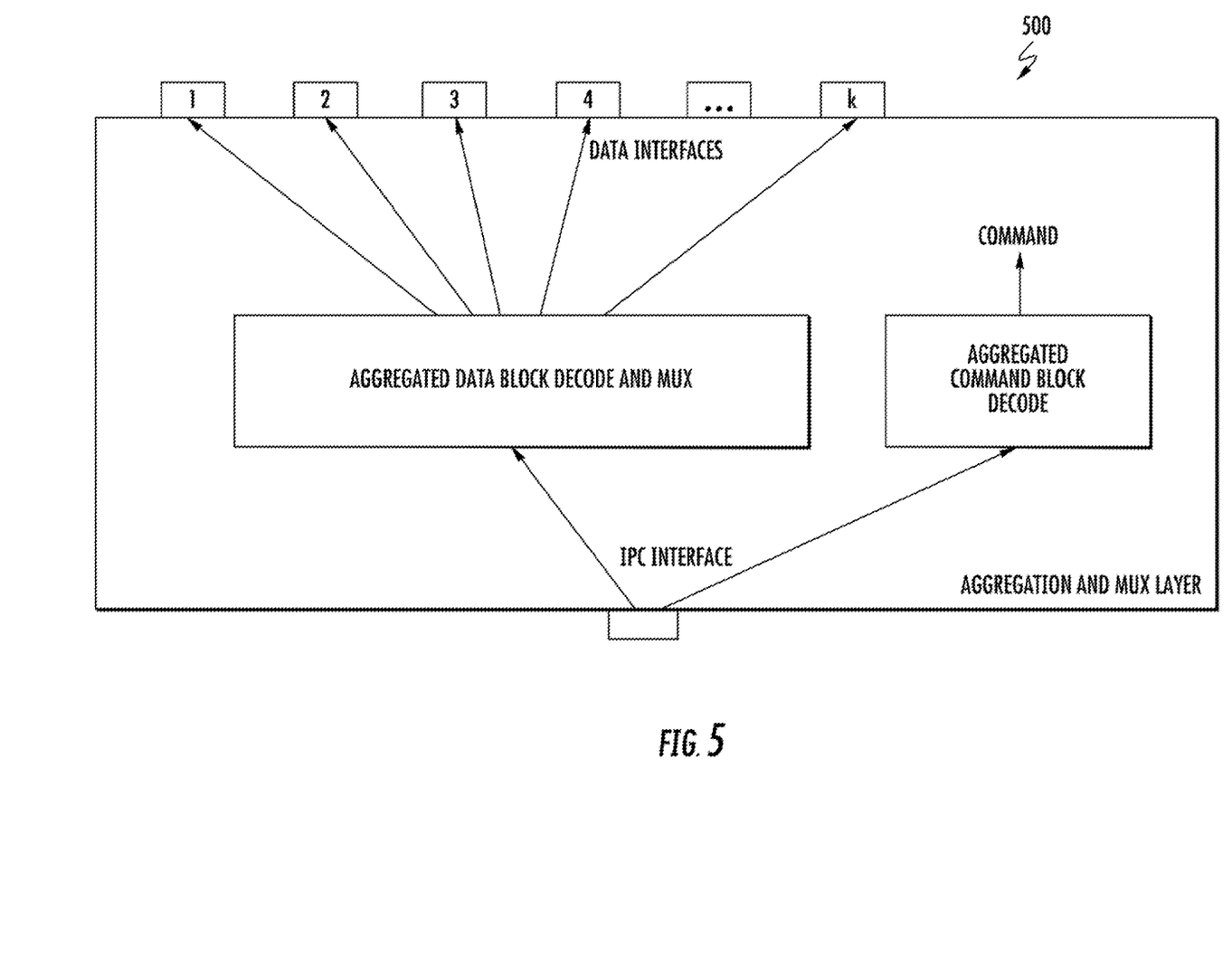
FIG. 5 illustrates is a logical block diagram illustrating one embodiment for receive path demultiplexing in accordance with the described embodiments.

FIGS. 4 and 5 illustrate the transmit path multiplexing, and receive path demultiplexing respectively.

As shown in FIG. 4, the datagrams of each virtual bus interface are multiplexed within the data block aggregator/encoder to form aggregated data blocks (e.g., see FIG. 2 and accompanying description). Specifically, for each virtual bus, a stream of datagrams is queued into a first sequential ordering. The index of each datagram within the first sequential ordering is used to generate a datagram table. The aggregated datagram table and associated datagrams represent the virtual bus transactions of the virtual bus interface.

The virtual bus transactions of multiple virtual buses are queued into a subsequent sequential ordering of the aggregated data block and creation of multiple datagram tables. The references for each virtual bus transaction references the next virtual bus transaction (e.g., as a linked list array). The resulting aggregated data block can then be combined with the aggregated command blocks.

In one such embodiment, each virtual bus interface further includes one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session). The session management commands for each virtual bus interface are queued within the command block aggregator/encoder as a command entry. For example, all of the commands associated with a particular interface identifier would be present within its corresponding command. The command entries are queued into an array. The references for each virtual bus command array references the next virtual bus command array (e.g., as a linked list array) to create the resulting aggregated command block.

In one exemplary embodiment, session management commands are configured to open and close new sessions within a virtual bus interface, and/or enable/disable virtual bus interfaces. For example, in one simplified case the session management commands may be configured to: open a session on a virtual bus interface, close a session on a virtual bus interface, enable flow control on a virtual bus interface, and disable flow control on a virtual bus interface. In some variants, commands may additionally be acknowledged (ACK) or not acknowledged (NACK). In some cases, NACK'd commands may be re-attempted until successful. In other cases, NACK'd commands may result in more sophisticated error handling.

As should be apparent to those of ordinary skill in the related arts, given the contents of the present disclosure, opening/closing a session will affect the amount of data (e.g., datagrams) transferred via a virtual bus interface, whereas enabling/disabling a virtual bus interface will suspend the virtual interface operation (e.g., a halt to all datagrams associated with the virtual interface).

As shown in FIG. 5, the datagrams of each virtual bus interface are demultiplexed within the data block demux/decoder to reconstitute the original virtual bus interfaces. Similarly, the session management commands for each virtual bus interface are recovered from the aggregated command block.

Methods—

Figure 6:
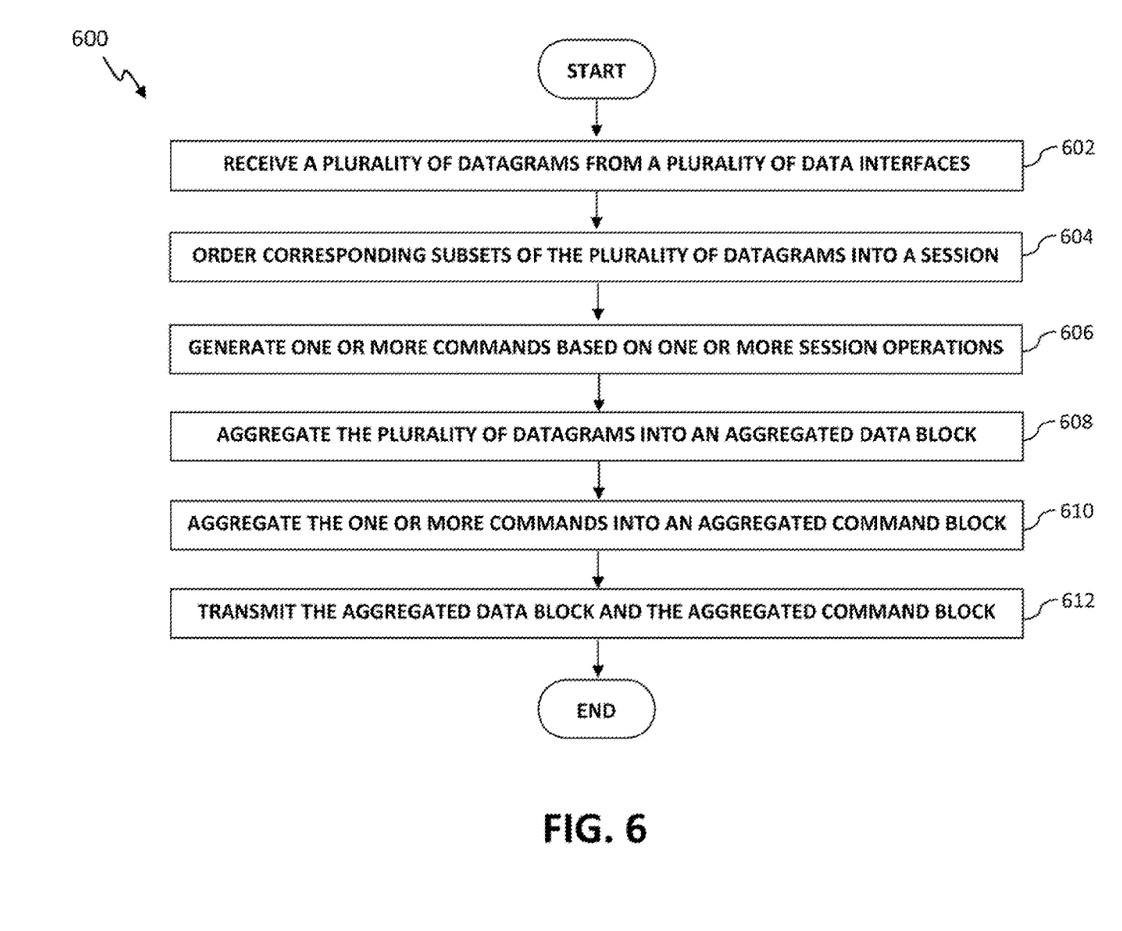
FIG. 6 illustrates is a logical flow diagram illustrating one embodiment of a generalized method for multiplexing a plurality of data structures into one or more aggregated data structures for transit via a virtualized bus interface, in accordance with the present disclosure.

FIG. 6 is a logical flow diagram of one embodiment of a generalized method 600 for multiplexing a plurality of data structures into one or more aggregated data structures for transit via a virtualized bus interface.

At step 602 of the method 600, a plurality of datagrams are received from a plurality of data interfaces of a transmitter. In one exemplary implementation, the plurality of datagrams include IPv6 and IPv4 (Internet Protocol) datagrams that are configured for transport over a packet switched communications network. While the present description is presented within the context of datagrams, those of ordinary skill in the related arts will readily appreciate that virtually any data structure and/or data format may be substituted with equal success. Common examples of other suitable data structures include, without limitation: compressed data, encrypted data, streaming data (e.g., audio/visual data), bulk data, control data (e.g., flow control, error checking information, etc.), etc.

In one embodiment, the packet switched communications network is configured as a host-peripheral network topology, where one or more hosts are configured to control and/or manage data transactions. As artisans of ordinary skill in the related arts will readily appreciate, the various principles described herein may be broadly applicable to both mastered networks (i.e., where a device or process has supervisory control over other devices or processes), as well non-mastered technologies (e.g., peer networks where peer devices arbitrate over shared resources, and/or network technologies characterized by dedicated connectivity, etc.).

While the foregoing datagrams are configured for use within packet switched networks, as described herein, the datagrams are not in the exemplary implementations transmitted within a packet switched network. Instead, the various embodiments described hereinafter multiplex (or aggregate) the datagrams (and corresponding control commands) into an aggregated data stream which is transmitted via a virtualized bus interface. In one exemplary embodiment, the virtualized bus interface enables a high speed physical link to support the data transactions between the data interfaces at the transmitter and corresponding receiver data interfaces.

In one exemplary embodiment, the plurality of data interfaces are associated with one or more distinct software applications that transact data via the aforementioned virtualized bus interface. Various embodiments may further subdivide the various ones of the data interfaces into e.g., virtualized software sessions, virtualized software ports, etc. In other embodiments, the plurality of data interfaces may be coupled to one or more external data sources via e.g., a physical port or interface and an appropriate networking fabric, hub, switch, relay, repeater, and/or network bridge. Those of ordinary skill in the related arts will readily appreciate that any software entity that is configured to communicate datagrams (e.g., IPv6 and IPv4) can be coupled to a data interface with minimal (if any) modification. Still other embodiments may interchangeably combine both virtualized and physical data interfaces.

For each one of the plurality of data interfaces, corresponding subsets of the plurality of datagrams are ordered into a session (step 604 of the method 600). As used herein, each "session" constitutes a persistent and/or semi-persistent set of data transactions between two logical endpoints. In some variants, the sessions may include stateful and/or stateless transactions. Stateful transactions incorporate historic "state" information as to the previous delivery of datagrams so as to e.g., enable error correction, retransmission, error detection, etc. Stateless transactions can be transacted without reference to previous transactions.

As used herein, a logical endpoint is defined, without limitation, as either the originating network address or the terminating network address of the data transaction within a transit network. For example, within IPv6 and IPv4 technologies, a datagram is sent from a starting address to a destination address, via a network of intermediary devices. While intermediary nodes may assist in the delivery of the datagram via intermediate "hop" transactions, intermediary nodes do not significantly alter the payload of the datagrams.

In some embodiments, the sessions may be ordered according to a specific priority or other organizational scheme. Common examples of priorities/schemes include without limitation: sequential datagram delivery, delivery within a specified time frame, guaranteed delivery, prioritized delivery, best effort delivery, minimum throughput/maximum latency delivery, etc. Those of ordinary skill in the related arts will readily appreciate that higher priority datagrams may be prioritized over other datagrams.

In some embodiments, the session ordering may be required to insert "padding" or similar ancillary data to conform to various transaction requirements and/or to optimize processing transactions. For example, in order to ensure that a minimum amount of data is transferred, some variants may add data that is fixed (all zeros, or all ones), random, or proprietary in nature. Similarly, where an overflow condition may occur (or may be predicted to occur), one or more datagrams may be punctured (i.e., where portions of data are removed), or skipped altogether. In some variants, modifications to the session are further flagged so as to facilitate restoration and/or prevent undesirable data corruption errors.

In some embodiments, the session ordering may be further configured to insert datagrams which have been previously transmitted (but were corrupted, not acknowledged, or otherwise not properly received). For example, in some systems, each datagram must be acknowledged (ACK) or not acknowledged (NACK). When a datagram is transmitted, but a NACK is returned or an ACK is never received or an ACK is received outside of acceptable response times, then the transmitter may re-attempt the transmission. In some cases, only a limited number of retransmissions are accepted. In alternative embodiments, failure to receive an ACK within acceptable time periods flags an error but not a retransmission. Still other ACK/NACK schemes will be readily appreciated by those of ordinary skill in the related arts, the foregoing being purely illustrative.

At step 606 of the method 600, one or more commands are generated based on one or more session operations. In one exemplary embodiment, the session management commands for each virtual bus interface are queued within a command block aggregator/encoder as command entries. In one such implementation, the commands associated with a particular interface identifier are queued into an array for subsequent aggregation.

More generally, those of ordinary skill in the related arts will readily appreciate that commands and/or aggregated command blocks are configured to control the session operation (either alone or in conjunction with one another). For example, session operation may include opening/closing a session, flow control on a corresponding session, etc. In some exemplary instances, command blocks and/or aggregated command blocks are transacted so as to trigger changes to session operation. In other exemplary instances, command blocks and/or aggregated command blocks are transacted so as to respond to datagrams received on the session (e.g., or the lack of received datagrams). Still other variants will be readily appreciated by those of ordinary skill in the related arts.

In some embodiments, the session operation may include generating metadata. For example, in some embodiments, the metadata includes so-called "hint data" which indicates that the data conforms to a particular format e.g., IPv4, IPv6, etc. Hint data can be used by downstream software to quickly determine the contents of the datagrams, thereby reducing processing burdens, etc. Other common examples of hint data include data directed to identifying specific data formats, and/or data traffic requirements. For example, certain audio/visual data payloads may be encrypted according to proprietary standards which deviate from generic data handling.

In another example, the metadata may include flow control commands. Common examples of flow control commands include without limitation: enabling a session, disabling a session, reducing/increasing a data rate for a session, etc. In one such variant, flow control is implemented based at least in part on a receiver of one or more data sessions indicating a current and/or future overflow condition. For example, a receiver may indicate to the transmitter that the received datagrams exceed the receiver's receive buffer (overflowing), or that the receiver's buffer is in danger of under-flow (i.e., data is consumed faster than is being received). Still other implementations may identify overflow or under-flow conditions based on out-of-sequence or missing datagrams.

At step 608 of the method 600, the plurality of datagrams are aggregated into an aggregated data block. In one exemplary embodiment, the aggregated data block includes the plurality of datagrams and one or more associated data tables. In one such embodiment, each data table is configured to identify its associated datagrams, and provide a reference to another data table (similar to a linked list). Those of ordinary skill in the related arts will readily appreciate that other types of data structures may be used with equivalent success; for example, the aggregated data block may include a table index which identifies each data table, whereupon each data table may be configured to identify its associated datagrams. Still other schemes may be readily contemplated by those of ordinary skill in the related arts, given the contents of the present disclosure.

An aggregated data block may include without limitation one or more of: a header, a footer, a start/end indication (pre-amble, post-amble), order information, error correction data, identifying information, format information, state information, etc. For example, in one exemplary embodiment, the aggregated data block header includes a signature field, sequence number, block length, and first table index. More generally, each aggregated data block may provide information so as to enable the receiver to separate the aggregated data block into its constituent datagrams.

A datagram may include without limitation one or more of: a header, a footer, order information, error correction data, and a payload. In one exemplary embodiment, each datagram includes padding information and a payload. In the exemplary case, the payload is an IP packet, however those of ordinary skill, given the contents of the present disclosure, will readily appreciate that other datagram formats may be substituted (e.g., proprietary and/or other application specific datagram formats). More generally, each datagram includes sufficient information to indicate how the datagram is to be interpreted with respect to its associated session. In one exemplary embodiment, a datagram table includes a signature, table length, interface identifier, next table index, and a plurality of datagram information (index, length, padding, etc.) The datagram table is configured to identify which datagrams of the aggregated data block are allocated to its associated session.

In some embodiments, a null datagram table may be provided where there are no datagrams for a session within an aggregated data block. In still other embodiments, when there are no datagrams for a session within an aggregated data block, then no data table is provided. In still other embodiments, session control may be handled within control commands that are provided via the aggregated command block. Still other variants will be readily appreciated by those of ordinary skill in the related arts.

At step 610 of the method 600, in addition to aggregating the datagrams into an aggregated data block, the one or more commands are aggregated into an aggregated command block. In some variants, the aggregated command block may include other useful information such as e.g., a header, a footer, a start/end indication (pre-amble, post-amble), order information, error correction data, identifying information, etc. For example, in one exemplary embodiment, the aggregated command block begins with a header that includes a signature field, sequence number, block length, and first command index.

In one exemplary embodiment, the session management commands associated with each data interface are queued within the command block together. For example, all of the commands associated with a particular session or data interface are grouped together. In other embodiments, the session management commands are ordered according to a priority (so as to ensure that highest priority commands are received first). In still other embodiments, the session management commands are ordered so as to minimize processing burden for unpacking the aggregate data block (e.g., based on sequential order, etc.).

At step 612 of the method 600, the aggregated data block and the aggregated command block are transmitted via a physical bus interface. In other embodiments, the aggregated data block and the aggregated command block may be transacted via different physical interfaces. For example, in some implementations, the data transfer occurs via a primary link, whereas the commands are transacted via an out-of-band or auxiliary interface.

Figure 7:
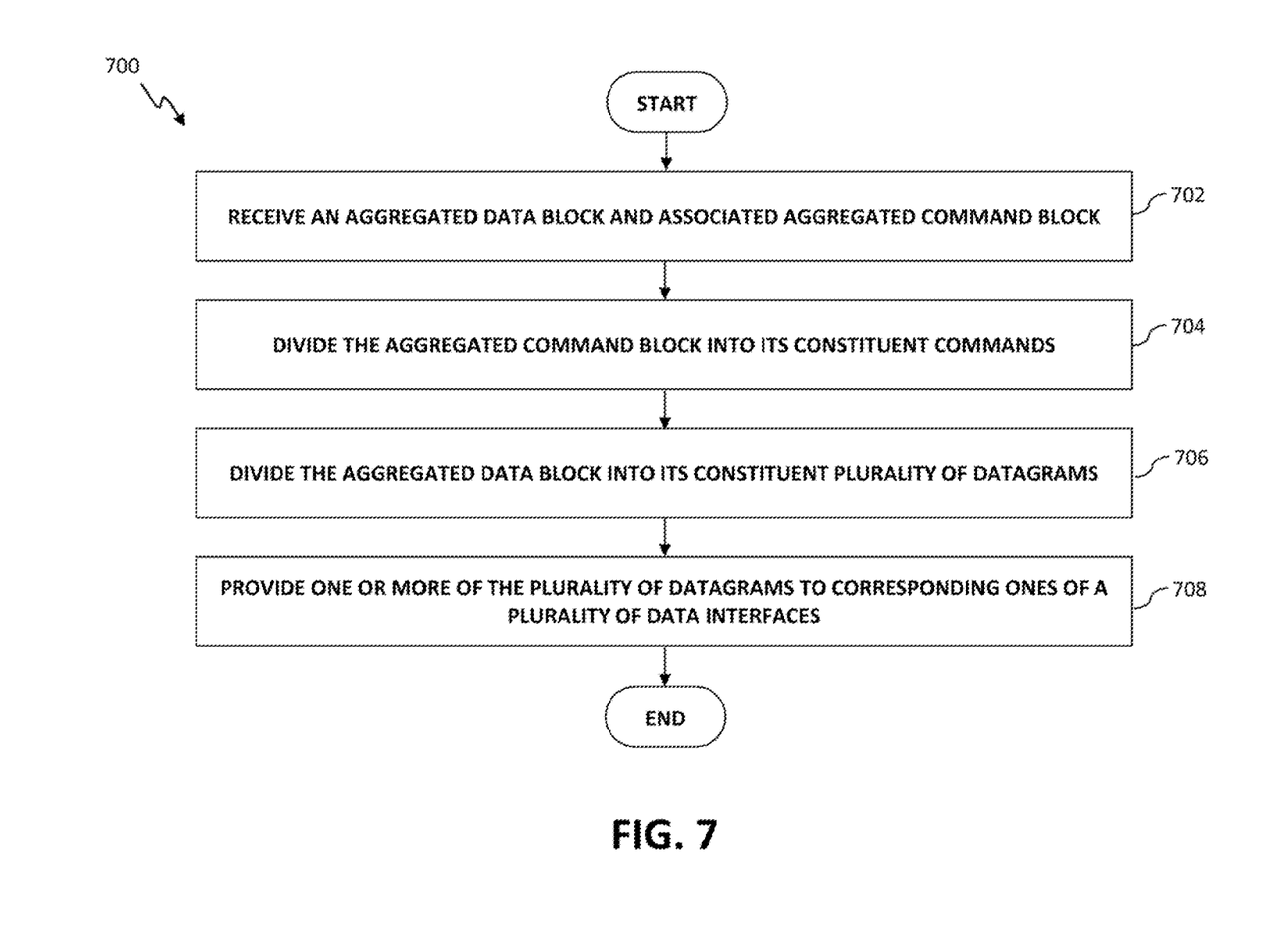
FIG. 7 is a logical flow diagram illustrating one embodiment of a generalized method for demultiplexing one or more received aggregated data structures into a plurality of data structures, according to the disclosure.

FIG. 7 is a logical flow diagram of one embodiment of a generalized method 700 for demultiplexing one or more received aggregated data structures into a plurality of data structures.

At step 702 of the method 700, an aggregated data block and associated aggregated command block are received. In some embodiments, the aggregated data block and associated aggregated command block are independently received. In other embodiments, the aggregated data block and associated aggregated command block are received concurrently. In still other embodiments, aggregated data blocks and aggregated command blocks are separately queued and a subsequent association is determined based on e.g., sequence numbers, etc.

At steps 704 of the method 700, the aggregated command block is divided into its constituent commands, and one or more session and ordering information is extracted from the aggregated command block. At step 706 of the method 700, the aggregated data block is divided into its constituent plurality of datagrams based on the extracted one or more session and ordering information. In some embodiments, steps 704 and 706 are performed concurrently or in parallel. In other embodiments, step 704 is performed prior to step 706 where the extracted command information is used to unpack the aggregated data block.

In some embodiments, the extracted command blocks and/or the extracted datagrams may be additionally verified for completeness and/or data corruptions. In the event of missing or corrupted datagrams and/or command blocks, the receiver may request a retransmission of the missing or corrupted datagrams and/or command blocks. In other variants, the receiver may log such errors for subsequent error analysis and/or to facilitate future resource allocations.

At step 708 of the method 700, the one or more of the plurality of datagrams are provided to corresponding ones of a plurality of data interfaces of a receiver. In some cases, the plurality of data interfaces of a receiver may receive other optimization information so as to reduce processing burdens where unnecessary (due to e.g., inactive sessions, hint track information, etc.).

While the foregoing methods are described based on a one-to-one relationship of one aggregated data block and one aggregated command block, it will be readily appreciated by those of ordinary skill in the related arts that a one-to-many, many-to-one or many-to-many relationship may be used with equal success with proper adaptation.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. Processor apparatus, comprising:
   a first digital processor;
   a physical bus interface in data communication with the first digital processor; and
   a computer readable medium comprising one or more computer readable instructions, the one or more computer readable instructions configured to, when executed by the first digital processor, cause the processor apparatus to:
   receive a plurality of datagrams from a plurality of data interfaces;
   for each one of the plurality of data interfaces:
      order a corresponding subset of the plurality of datagrams into a corresponding session;
      generate one or more commands based on one or more session operations associated with the corresponding session;
   aggregate the plurality of datagrams into an aggregated data block;
   aggregate the one or more commands into an aggregated command block; and
   transmit the aggregated data block and the aggregated command block via the physical bus interface.

2. The processor apparatus of claim 1, wherein the one or more commands comprise one or more flow control commands for the corresponding session.

3. The processor apparatus of claim 2, wherein the corresponding session is associated with a single data interface of the plurality of data interfaces.

4. A method of multiplexing a plurality of data structures into one or more aggregated data structures for transit via a virtualized bus interface, comprising:
   aggregating a plurality of datagrams into an aggregated data block, the aggregating the plurality of datagrams into an aggregated data block being characterized at least in part by one or more commands;
   aggregating the one or more commands into an aggregated command block; and
   transmitting the aggregated data block and the aggregated command block.

5. The method of claim 4, wherein the transmitting the aggregated data block is performed via at least a physical bus interface.

6. The method of claim 5, wherein the transmitting the aggregated command block is performed via at least the physical bus interface.

7. The method of claim 5, wherein the transmitting the aggregated command block is performed via at least an out-of-band interface.

8. The method of claim 4, wherein the one or more commands comprise data indicative of an addition or removal of a session, the session comprised of a subset of the plurality of datagrams.

9. The method of claim 4, wherein the one or more commands comprise data indicative of an increase or decrease of a data rate associated with a session, the session comprised of a subset of the plurality of datagrams.

10. The method of claim 4, wherein the one or more commands comprise data indicative of a presence of one or more padding data within a session, the session comprised of a subset of the plurality of datagrams.

* * * * *